United States Patent [19]
Wauer

[11] Patent Number: 6,075,463
[45] Date of Patent: Jun. 13, 2000

[54] APPARATUS FOR WIRELESSLY TRANSMITTING THE TEMPERATURE AND AN IDENTIFYING CHARACTERISTIC OF A COOKING POT TO A STOVE

[75] Inventor: Roman-Hartmut Wauer, Kisslegg, Germany

[73] Assignee: AKO-Werke GmbH & Co. KG, Wangen, Germany

[21] Appl. No.: 09/088,615

[22] Filed: Jun. 1, 1998

[30] Foreign Application Priority Data

Jun. 3, 1997 [DE] Germany .............................. 197 23 127

[51] Int. Cl.[7] ............................................ G08C 19/12
[52] U.S. Cl. ........................... 340/870.17; 340/872.2; 340/872.78; 340/584; 219/518
[58] Field of Search .................... 340/870.17, 870.16, 340/870.28, 572.2, 572.7, 584; 219/518, 506, 447.1, 706, 685, 448.17, 626, 665

[56] References Cited

U.S. PATENT DOCUMENTS

| 3,706,094 | 12/1972 | Cole et al. | ................................. | 342/44 |
|---|---|---|---|---|
| 3,814,888 | 6/1974 | Bowers | ..................................... | 219/624 |
| 4,013,859 | 3/1977 | Peters | ........................................ | 219/626 |
| 4,237,368 | 12/1980 | Welch | ................................. | 219/448.17 |
| 4,367,388 | 1/1983 | Ishihara | ..................................... | 219/685 |
| 4,868,357 | 9/1989 | Serikawa | .................................. | 219/706 |
| 5,296,684 | 3/1994 | Essig | ......................................... | 219/518 |

FOREIGN PATENT DOCUMENTS

| 32 25 486 A1 | 1/1984 | Germany . |
|---|---|---|
| 94 16 779 | 1/1995 | Germany . |
| 195 02 935 A1 | 8/1996 | Germany . |

OTHER PUBLICATIONS

F. Schmidt, et al., Remote Sensing of Physical Parameters by Means of Passive Surface Acoustic Wave Devices, Jan. 1997.

*Primary Examiner*—Michael Horabik
*Assistant Examiner*—Albert K. Wong
*Attorney, Agent, or Firm*—Scully, Scott, Murphy & Presser

[57] ABSTRACT

In an apparatus for wirelessly transmitting the temperature and an identifying characteristic of a cooking pot placed on one of the cooking zones of a stove to an electronic transmitting-receiving arrangement of the stove, the aim is to make it unnecessary to produce an operating voltage on the cooking pot. An antenna arrangement 4 of an electronic transmitting-receiving arrangement 14 is arranged under a cooking zone 2. A surface wave sensor 6 is exposed to the temperature of the cooking pot 5 and carries an identifying characteristic in the arrangement of its reflectors 11.

9 Claims, 2 Drawing Sheets

APPARATUS FOR WIRELESSLY TRANSMITTING THE TEMPERATURE AND AN IDENTIFYING CHARACTERISTIC OF A COOKING POT TO A STOVE

BACKGROUND OF THE INVENTION

1. Field of the Invention

The invention concerns an apparatus for wirelessly transmitting the temperature and an identifying characteristic of a cooking pot placed on one of the cooking zones of a stove to an electronic transmitting-receiving arrangement of the stove.

2. Discussion of the Prior Art

An apparatus of that kind is described in DE 32 25 386 A1. It serves for controlling the power of the respective cooking zone, in accordance with the respective need involved. DE 32 25 486 A1 discloses the provision on a cooking pot of a measuring station which radiates to an interrogation station temperature signals corresponding to the temperature of the cooking pot or the item being cooked. Besides the measurement value, the measuring station can also transmit an identification characteristic. The operating energy for the active transmitting portion of the measuring station is obtained from a microwave energy field which is radiated by the interrogation station. If the measuring station which is to be mounted to the cooking pot or the lid thereof is implemented in a practical context, the measuring station is already comparatively large for the simple reason that it requires a temperature sensor and a circuit which takes electrical energy from the energy field and stores it in order to emit measurement signals by way of the active components. Problems also occur in regard to washability of the cooking pot, in particular if it is intended to be cleaned in a washing machine.

The interrogation station of DE 32 25 486 A1 is to be arranged above the stove, for example in an extractor hood. It is therefore necessary to provide an external connection to the stove control assembly. That makes installation expensive and involves an adjustment requirement because the sensor is to be directed on to the cooking zone in targeted relationship therewith.

DE 195 02 935 A1 describes an apparatus for locating a cooking vessel which is provided with an active transmitter. A plurality of antennae are arranged in a distributed array at the cooking appliance, more specifically under the glass ceramic plate or hob thereof, whereby the intention is to be able to establish the cooking location over which the cooking vessel in question is disposed. The transmitter transmits for example temperature data to the cooking appliance, for which purpose it has a temperature sensor. A battery or an accumulator is required for the supply of power for the transmitter.

It is assumed in DE 195 02 935 A1 that the cooking vessels used are metal. If the cooking vessels used consist of a different material, the field line configuration changes considerably so that it becomes difficult to detect the position of the cooking vessel. Problems occur in particular if the intention is to be able selectively to use cooking vessels of metal and glass or ceramic.

If, in DE 195 02 935 A1, a plurality of cooking vessels with transmitters are used at the same time on the cooking appliance, difficulties are then encountered in terms of evaluating the individual transmitter signals. It is therefore proposed that the transmitters should additionally be provided with a receiver which detects whether an adjacent pot is transmitting at the same time. That means that the cooking vessel becomes even more expensive.

DE 94 16 779 U1 discloses a sensor-controlled glass ceramic cooking location unit. It comprises a cooking assembly which is suitable for an infra-red sensor, a glass ceramic cooking surface or hob, and a radiant heating source arranged beneath the glass ceramic cooking surface or hob. The cooking assembly corresponds with an ancillary electronic assembly by way of an infra-red path. The electronic ancillary assembly interchanges cooking data with an electronic system of the cooking hob, in which case the radiant heating source is controlled in the proximity of the cooking process. The ancillary assembly takes up space on the glass ceramic cooking surface and must be exactly oriented with the respectively associated cooking assembly. An identifying characteristic of the cooking assembly cannot be transmitted in this case.

In the above-mentioned state of the art there is also the disadvantage that articles or coatings or coverings which are introduced into the respective wireless transmission path can considerably disturb transmission.

SUMMARY OF THE INVENTION

The object of the present invention is to propose an apparatus of the kind set forth in the opening part of this specification, in which no transmitting element which has to be supplied with an operating voltage is required on the cooking pot, in which the cooking pots can comprise different materials, in which, besides temperature, an encoded identifying characteristic of cooking pot units can also be transmitted, and in which other articles do not in practice interfere with transmission.

In accordance with the invention the foregoing object is attained in that an antenna arrangement of an electronic transmitting-receiving arrangement is arranged in relation to at least one cooking zone under a non-metal plate forming the cooking zones, such that its radiation region is approximately limited to the space in which a cooking pot placed on said cooking zone is disposed, that the electronic transmitting-receiving arrangement produces an electromagnetic transmission pulse, that arranged at the cooking pot is a surface wave sensor having an antenna, a piezoelectric crystal and reflectors, wherein the piezoelectric crystal is exposed to the temperature of the item being cooked or the cooking pot and the identification characteristic of the cooking pot is embodied in the arrangement of the reflectors, and that the electronic transmitting-receiving arrangement evaluates the pulses which are reflected by the antenna of the surface wave sensor.

The surface wave sensor used is known per se. It does not require any operating voltage supply and it includes an encoding option. Such a surface wave sensor is described for example in U.S. Pat. No. 3,706,094. Reference is made to the possibility of temperature detection by means of such a surface wave sensor in the company publication from Siemens AG, Munich, F Schmidt et al 'Remote sensing of physical parameters by means of passive surface acoustic wave devices ('ID-TAG')'.

The apparatus according to the invention has various functional and structural advantages:

a) As the radiation region of the antenna arrangement is directed in each case only over one of the cooking zones, there is from the outset an unambiguous association of cooking zone and cooking pot.

b) As the antenna arrangement is arranged beneath the non-metallic plate, in particular a glass ceramic plate, the transmission distance is short so that low levels of sending power are sufficient.

c) No space for the antenna arrangement is required on the plate itself. The entire apparatus—except for the surface wave sensor—is integrated in the stove itself.

d) The transmission path can scarcely be disturbed by other articles.

e) No additional temperature sensor is required on the cooking pot because the piezoelectric crystal of the surface wave sensor itself performs the temperature measuring function.

f) The surface wave sensor serves not only for simple pot recognition, but it can transmit an encoded identifying characteristic which includes items of information about the diameter, the height, the material or the type of cooking pot.

g) No active electronic components are required on the cooking pot because the surface wave sensor operates without its own operating voltage source.

h) The mode of operation involved is independent of the material of the cooking pot so that it is also possible to cook in a mixed or hybrid manner with cooking pots consisting of metal, ceramic or glass.

i) By virtue of its simple structure the surface wave sensor is easy to mount to the cooking pot or to integrate in same. It readily withstands the temperatures that occur and does not require any particular care when washing the cooking pot.

j) When using only one sensor it is arranged centrally in the hot region of the cooking zone.

k) The sensor serves at the same time for temperature detection.

l) When using three sensors they are arranged symmetrically around the cooking zone and detect pot displacement from the altered travel length of a sensor beam.

m) The sensors can be subsequently fitted, more specifically subsequently glued in place.

n) The reflector is in principle energy-less and changes its behaviour upon a variation in temperature. It reflects changed signals which the sensor evaluates.

BRIEF DESCRIPTION OF THE DRAWINGS

Advantageous configurations of the invention are set forth in the appendant claims and the following description. In the drawing:

DETAILED DESCRIPTION OF A PREFERRED EMBODIMENT

A stove or cooking hob has a glass ceramic plate 1 on which a plurality of cooking zones 2 are provided. Only one cooking zone 2 is shown in the Figures. Arranged under each cooking zone 2 is a radiant heating means 3, the output power of which is controllable or regulatable by an electronic control system (not shown).

Figure 1:
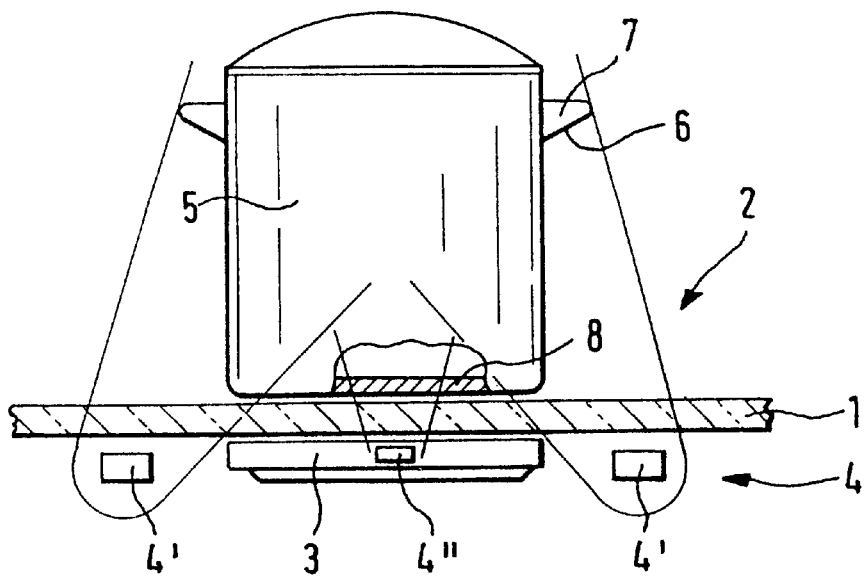
FIG. 1 diagrammatically shows a cooking pot on one of the cooking zones of a glass ceramic plate.
Figure 2:
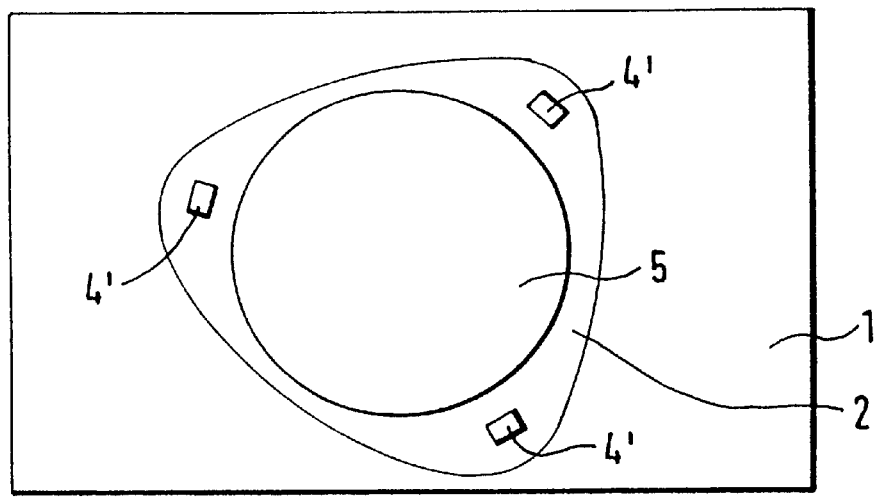
FIG. 2 is a plan view of the apparatus shown in FIG. 1.

An antenna arrangement 4 is installed under the glass ceramic plate 1 at the cooking zone 2. FIG. 1 shows two embodiments for the antenna arrangement 4. In the case of the one antenna arrangement, three antennae 4' are arranged in a distributed array around the radiant heating means 3. In the case of the other antenna arrangement, an antenna 4" is arranged centrally in relation to the radiant heating means 3. In both cases the radiation region of the antennae 4', 4" is such that it is restricted to the space on which a cooking pot 5 which is placed on the cooking zone 2 can be disposed. The antennae radiate a high-frequency pulse in the microwave range of a frequency of about 0.8 to 3 GHz. The radiation characteristic approximately corresponds to that of a light cone (see FIG. 1 and FIG. 2).

Figure 4:
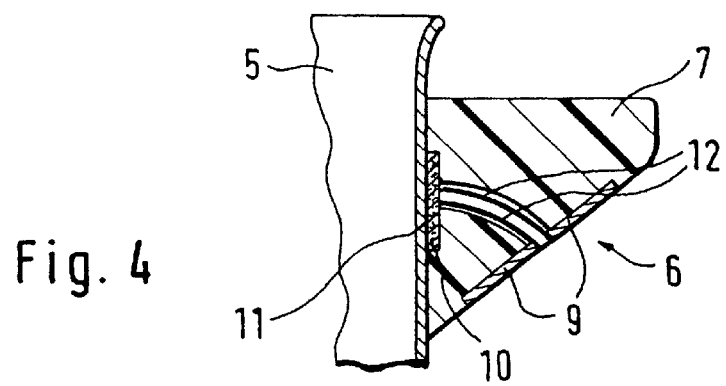
FIG. 4 shows a surface wave sensor on a handle of a cooking pot.

The antenna arrangement with the three antennae 4' is provided for the situation where the cooking pot 5 carries a surface wave sensor 6 in its handle 7 (see FIG. 4). The three antennae 4' together form a radiation region which detects the handle 7 in its possible positions. If necessary it is also possible for more than three antennae to be arranged around the radiant heating means 3.

Figure 3:
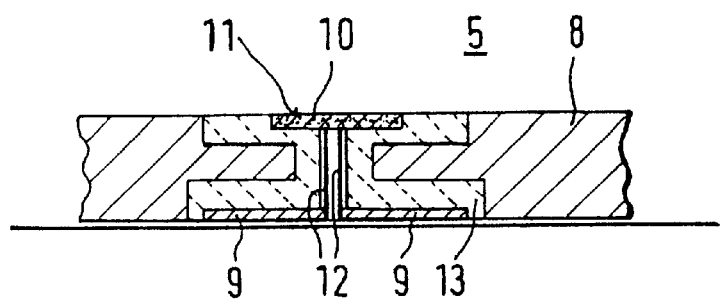
FIG. 3 shows a surface wave sensor integrated into the bottom of a cooking pot.

The central antenna 4" is provided when using a cooking pot 5 in which the surface wave sensor 6 is integrated into the bottom 8 of the cooking pot 5 (see FIG. 3).

Figure 5:
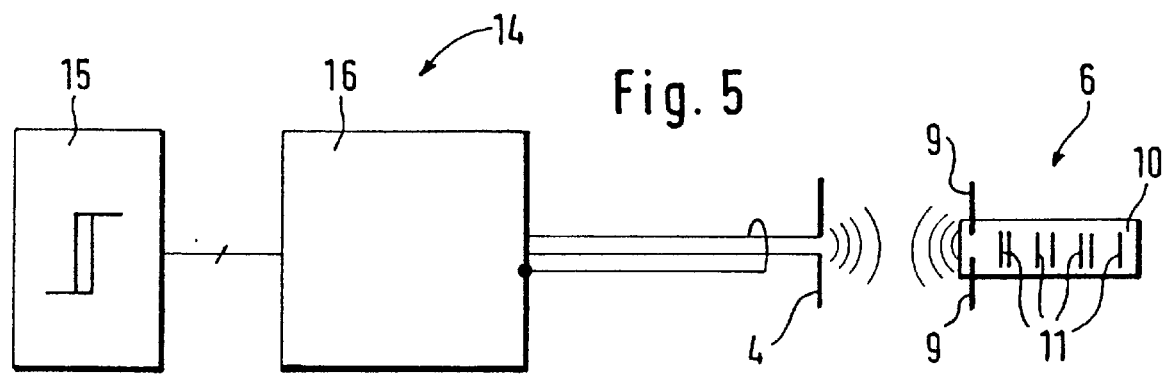
FIG. 5 shows a block circuit diagram of the apparatus.

The surface wave sensor 6 has a dipole antenna 9, a piezoelectric crystal 10 in slice form and reflectors 11 on the piezoelectric crystal 10. The spatial arrangement of the reflectors 11 includes a coding (see FIG. 5). That coding can be selected in accordance with the diameter, the height, the type or similar properties of the cooking pot 5.

In the embodiment shown in FIG. 3 the piezoelectric crystal 10 is arranged at the inside of the bottom 8 of the cooking pot 5 so that it is directly exposed to the temperature of the item being cooked. The dipole antenna is disposed on the outside on the bottom 8, in the radiation region of the antenna 4". The dipole antenna 9 is connected to the piezoelectric crystal 10 by way of electrical conductors 12. The surface wave sensor 6 is embedded in the bottom 8 in a thermally resistant, electrically non-conducting and mechanically dense insulating layer 13.

In the embodiment of FIG. 4 the piezoelectric crystal 10 is in electrically conducting communication with the outer surface of the cooking pot 5 in the region of the handle 7. The dipole antenna 9 is integrated on the outside into the handle 7. The electrical conductors 12 extend in the handle 7.

Figure 6:
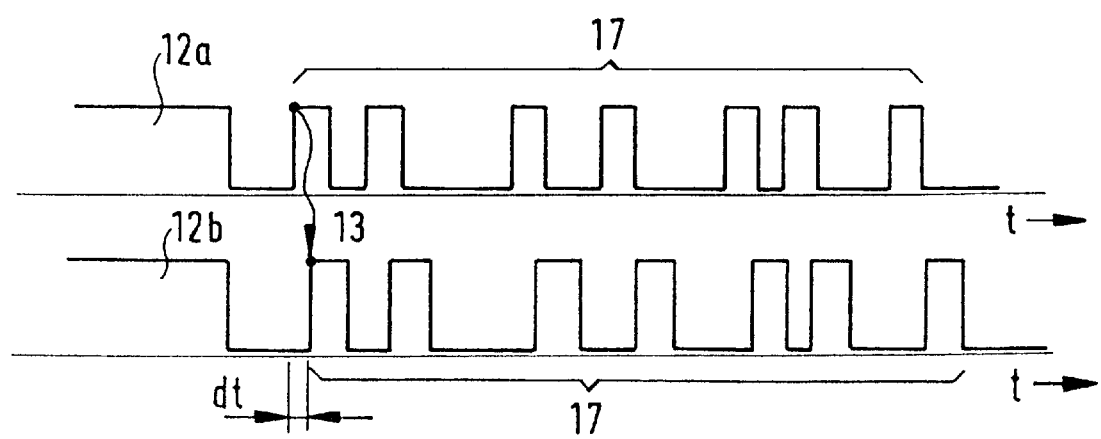
FIG. 6 shows a pulse diagram.

Arranged beneath the glass ceramic plate 1 is an electronic transmitting-receiving arrangement 14 which has a transmitter circuit 15 and an evaluation circuit 16. The transmitter circuit 15 passes a microwave pulse to the antenna arrangement 4 at certain time intervals. That pulse is received by the dipole antenna 9 of the cooking pot 5 which has been placed on the cooking zone 2. The pulse results in an acoustic wave at the piezoelectric crystal 10. That acoustic wave acts on the reflectors 11 which are coupled to the dipole antenna 9 and produce at same a signal pattern which corresponds to the position thereof with respect to the dipole antenna 9. That signal pattern is detected by the antenna arrangement 4 and processed by the evaluation circuit 16 to afford a pulse pattern. Two such pulse patterns are shown in FIG. 6. The two pulse patterns are the same in the time intervals of the seven individual pulses 17, while the time intervals of the individual pulses 17 correspond to the spatial distances between the seven reflectors 11 (see FIG. 5). Other distances between the reflectors 11 would result in different pulse patterns. The evaluation circuit 16 can therefore recognise the reflector arrangement and thus the encoding involved, by virtue of evaluation of the spacings between the individual pulses 17.

As the propagation of the acoustic waves in the piezoelectric crystal 10 is dependent on its temperature, there is a phase shift dt between the pulse patterns at different temperatures. That phase shift dt is illustrated in FIG. 6. The evaluation circuit 16 acquires information about the temperature obtaining at or in the cooking pot 5, from that phase shift dt. The evaluation circuit 16 passes the ascertained temperature signal, possibly linked with the identifying characteristic of the cooking pot 5, to the above-mentioned electronic control system of the radiant heating means 3 in order to adjust the output power thereof in accordance with the respective needs involved.

The surface wave sensor 6 can also be secured to the outside of the cooking pot 5. For example an adhesive layer, for example in the form of an adhesive label, is suitable for that purpose. In that way it is possible for the surface wave sensor 6 also to be subsequently mounted to a cooking pot 5. It is thus also possible to use such cooking pots which exist in any case for the cooking procedure while making use of the advantages of the described apparatus.

What is claimed is:

1. Apparatus for wirelessly transmitting the temperature and an identifying characteristic of a cooking pot to a stove comprising:

a non-metallic plate located in a cooking zone in the stove;

a cooking pot in communication with the cooking zone;

a transmitting-receiving arrangement located under the cooking zone, the arrangement including an antenna arrangement for producing and transmitting an electromagnetic pulse directed at the cooking pot;

a surface wave sensor attached to the cooking pot including, a second antenna, a piezoelectric crystal, and reflectors, wherein the piezoelectric crystal is exposed to the temperature of the cooking pot and wherein the reflectors identify the characteristic of the pot, the sensor reflects and modifies the pulses via the second antenna, and the transmitting-receiving arrangement evaluates the reflected pulses to determine the temperature and characteristic of the pot.

2. Apparatus according to claim 1 wherein the plate is a glass ceramic material.

3. Apparatus according to claim 1 or 2, wherein the antenna arrangement (4) comprises at least three antennae (4') arranged around the cooking zone (2).

4. Apparatus according to claim 2 wherein the antenna arrangement (4) is arranged approximately in the centre of the cooking zone (2).

5. Apparatus according to claim 1, wherein the surface wave sensor (6) is arranged at the edge or at a handle (7) of the cooking pot (5), the piezoelectric crystal (10) being in thermally conducting communication with the cooking pot (5).

6. Apparatus according to claim 1, wherein the surface wave sensor (6) is fitted into the bottom (8) of the cooking pot (5), wherein the piezoelectric crystal (10) is disposed on the inside of the bottom (8) and the antenna (9) is disposed on the outside of the bottom (8).

7. Apparatus according to claim 6 wherein the surface wave sensor is installed at the bottom of the pot in a thermally resistant, electrically non-conducting insulating layer.

8. Apparatus according to claim 1, wherein the surface wave sensor (6) is fixed exteriorly to the cooking pot (5).

9. Apparatus according to claim 1, wherein the cooking pot (5) is constituted of material selected from the group of materials consisting of metal, glass and ceramic.

* * * * *